United States Patent [19]

MacCarthy

[11] Patent Number: 4,740,046
[45] Date of Patent: Apr. 26, 1988

[54] LIQUID KALEIDOSCOPE

[76] Inventor: Patrick MacCarthy, 5263 Arbutus St., Arvada, Colo. 80002

[21] Appl. No.: 866,705

[22] Filed: May 27, 1986

[51] Int. Cl.⁴ .......................................... G02B 23/00
[52] U.S. Cl. ..................................................... 350/4.2
[58] Field of Search ................... 40/406, 439, 441; 353/1, 2; 350/4.1, 4.2

[56] References Cited

U.S. PATENT DOCUMENTS

| | | | |
|---|---|---|---|
| 1,078,008 | 11/1913 | Stough | 350/4.2 |
| 2,484,116 | 10/1949 | Papke | 350/4.1 |
| 3,039,356 | 6/1962 | Knittel | 350/4.2 |
| 3,383,150 | 5/1968 | Powers | 350/4.2 |
| 3,738,036 | 6/1973 | Landsinger et al. | 350/4.2 X |
| 3,748,013 | 7/1973 | Orans | 350/4.2 |
| 3,756,685 | 9/1973 | Forsee | 350/4.2 |
| 3,973,340 | 8/1976 | Khawand | 40/406 |

OTHER PUBLICATIONS

Mirrors, Prisms and Lenses, James P. C. Southhall, 3rd Edition, pp. 42–51, 1918.
Curiosities of Light Rays and Light Waves, S. Tolansky, pp. 16–25, 1964.
The Amateur Scientist, Scientific American, Dec. 1985, vol. 253, No. 6, pp. 134–145.
Through the Kaleidoscope, Cozy Baker, Beechcliff Books, Annapolis, Maryland, 1985.

Primary Examiner—Richard A. Wintercorn
Attorney, Agent, or Firm—Oblon, Fisher, Spivak, McClelland & Maier

[57] ABSTRACT

One or more tubular channels contain liquid, a fluent solid, or a mixture of liquid and solid particles. The channels limit the spatial extent of the contents and constrain the contents to flow in limited directions. The channels may consist of a closed loop through which the contents can flow as the kaleidoscope is rotated. The direction of flow can be reversed by reversing the direction of rotation of the kaleidoscope. The contents in different channels are preferably colored differently. The channels may exist side-by-side or may be intertwined. Multiple reflections in the mirrors of the kaleidoscope of the stationary or moving contents generate pleasant static or dynamic symmetrical designs. These designs can be reproduced at will. The nature of the design that is observed by rotating the kaleidoscope can be altered by changing the position of the object cell relative to the mirrors.

13 Claims, 2 Drawing Sheets

LIQUID KALEIDOSCOPE

FIELD OF THE INVENTION

This invention relates to the field of optical toys and amusement devices. More specifically, this invention relates to a kaleidoscope wherein the object cell contains, or consists of, one or more tubular sections in which at least one liquid is constrained to flow in spatially confined volumes and in controlled directions. Observation, through the eye-piece of the kaleidoscope, of the multiple images of the liquid, and of the varying designs as the liquid moves, reveals a symmetrical pattern of a type that is distinct from designs produced in kaledisoscopes known heretofore.

BACKGROUND OF THE INVENTION

A typical kaleidoscope consists of two or more elongated, planar mirrors positioned side-by-side, lengthwise, each pair touching at one long edge and inclined at a fixed angle with respect to each other. The reflecting surfaces of the mirrors are located on the inside of the "V" that is formed from each adjacent pair of mirrors. Most common kaleidoscopes contain two mirrors, typically at an angle of 36°, 45° or 60° with respect to each other, or three mirrors at 60° with respect to each other. The cross-section in the latter case is an equilateral triangle. Generally, the mirrors are housed in a tubular container, to which they are fixedly attached. In this specification, the container will be referred to as a "tube". Usually, but not necessarily, the tube is cylindrical.

Generally, one end of the tube is blocked off with opaque material, but contains an opening for looking into. Occasionally, this opening contains a lens, but generally it does not. This viewing hole, with or without a lens, is usually referred to as the "eye-piece," and it will be so referred to in this specification. The eye-piece is positioned so that one can look down the trough between the reflecting surfaces of the mirrors.

The opposite end of the tube generally consists of a receptacle containing movable objects. This receptacle is attached to the tube. The end of the receptacle closest to the eye-piece is usually transparent, and the opposite end is usually translucent. The other sides of the receptacle may be transparent, translucent, or opaque. In the literature of kaleidoscopes, this receptacle is generally referred to as the "object box" or "object cell," and the items within the receptacle are referred to as "objects". The terms "object cell" and "objects" will be used in this specification.

Most frequently the objects consist of colored solids such as glass, plastic, or stone. Sometimes common household items such as paper clips, rubber bands, etc. are used for objects.

When in use, the kaleidoscope is usually held essentially horizontally. When one looks into the eye-piece, one sees a symmetrical design based on the objects that are in the object cell. The symmetrical design results from directly viewing the objects in the object cell that lie in the area corresponding to the trough of the mirrors in conjunction with the multiple reflections of those objects in the mirrors. The cross-sectional area of the object cell that is directly visible by looking through the eye-piece is referred to as the "direct field of view" in this specification.

By rotating the kaleidoscope, the objects in the object cell are allowed to tumble about and fall into new, random arrangements, thus giving rise to an infinite number of possible symmetrical designs. For some kaleidoscopes, the object cell is rotatably attached to the tube such that the object cell can be rotated about the longitudinal axis of the kaleidoscope while the mirrors are maintained essentially stationary. The "longitudinal axis" is defined as the axis that extends symmetrically, or essentially symmetrically, along the length of the tube. In this case, various designs can be generated by rotating the object cell alone, rather than rotating the kaleidoscope as a whole.

Modifications of the kaleidoscope in which the object cell rotates about an axis that is orthogonal to the longitudinal axis of the kaleidoscope are described by Stough in U.S. Pat. No. 1,078,008 and by Forsee in U.S. Pat. No. 3,756,685. In some kaleidoscopes, the object cell is removable from the tube of the kaleidoscope, and some kaleidoscopes contain a set of replaceable object cells.

The object cell of some kaleidoscopes consists of a liquid-tight container or segmented container, and the objects consist of a liquid or liquids. Descriptions of such liquid-containing kaleidoscopes are given by Knittel in U.S. Pat. No. 3,039,356, by Powers in U.S. Pat. No. 3,383,150, and by Orans in U.S. Pat. No. 3,748,013. The kaleidoscope that is described by Knittel contains an object cell that is rotatable with respect to the tube about the longitudinal axis. The object cell in that kaleidoscope is partly filled with a liquid, and the object cell contains a number of baffles which cause the liquid to be scooped up and spilled as the object cell is rotated. This movement of the liquid generates a moving, symmetrical design that is visible through the eye-piece. In column 4, lines 5 through 21 of U.S. Pat. No. 3,039,356, Knittel explains how different types or styles of designs are produced in this particular kaleidoscope depending on whether the object cell is rotated while the tube is held stationary or the kaleidoscope as a whole is rotated.

The theory of kaleidoscopes is described in a number of textbooks on optics, such as: "Mirrors, Prisms and Lenses", 3rd edition, by J. P. C. Southhall, Macmillan Co., New York, 1933, pages 43–51, and "Curiosities of Light Rays and Light Waves" by S. Tolansky, American Elsevier Publishing Co., New York, 1965, pages 20–24. An article by J. Walker in Scientific American (Dec. 1985, Vol. 253, No. 6, pages 134–138, 144, 145) further discusses the theory of kaleidoscopes. A book entitled "Through the Kaleidoscope" by Cozy Baker (Beechcliff Books, Annapolis, Md., 1985) describes many kaleidoscopes that are currently available on the market.

SUMMARY OF THE INVENTION

The present invention relates to a novel object cell for a kaleidoscope and the resulting kaleidoscope incorporating this object cell. The object cell of the present invention may be used with any type of kaleidoscope mirror combination and arrangement. The object cell of the present invention contains channels which direct the movement of the objects within confined portions of the direct field of view and which constrains the objects to move in particular directions. The objects in the proposed invention may be solids such as fluent powders or liquids, but all of the discussion herein will be presented in terms of liquids.

In an important modification of the invention, the liquid is allowed to circulate within closed-loop channels of the object cell as the kaleidoscope, or the object cell alone, is rotated. The liquid in these channels, and the changes as the liquids enter and leave various parts of the channels, give rise to symmetrical patterns that are quite different from those obtained with kaleidoscopes heretofore known. The combination of more than one channel, each containing a differently-colored liquid, can give rise to particularly pleasing patterns. Use of channels of different shapes and/or dimensions results in different designs.

In the modification containing more than one independent closed-loop channel capable of circulatory flow, different liquids may enter and leave the direct field of view at different times as the kaleidoscope is rotated, giving rise to dynamic, symmetrical designs in which a design in one color is followed by a design in another color, or in which two or more designs may appear simultaneously or may become superimposed upon each other.

The object cell of the present invention may be rotatably attached to the tube so that the object cell may be rotated about the longitudinal axis of the kaleidoscope. Rotation of the object cell while maintaining the tube (and its attached mirrors) stationary produces a symmetrical image in which the form of the design constantly changes during the course of one revolution. Rotation of the kaleidoscope as a whole produces a dynamic pattern effect in which the form of the design remains unchanged during the rotation.

In other modifications of the invention, the object cell may be rotatable with respect to the tube about axes that are orthogonal to the longitudinal axis of the kaleidoscope. The object cell may also be translatable in a plane orthogonal to the longitudinal axis with respect to the tube. Additionally, the object cell may be detachable from the tube and replaceable with a different object cell.

For the purposes of describing the instant invention more precisely later in this specification, other terms are defined here. Any plane that includes the longitudinal axis is called a longitudinal plane. Any plane that is orthogonal to the longitudinal axis is called a transverse plane.

A further distinction and concomitant definitions are necessary to unambiguously describe the novel features of the instant invention. The object cell of the present invention contains a number of tubular sections. These tubular sections themselves (in the absence of any liquid therein) will produce a symmetric image in the mirrors. For a given tubular arrangement in an object cell, and a given mirror arrangement in the kaleidoscope, the nature of this image depends on the position and orientation of the object cell relative to the mirrors. Even when this position and orientation are fixed, different designs are still possible depending on the sequence of liquids flowing into and out of the cells. The image pattern that it sets up for a given positioning of the object cell relative to the mirrors will be referred to as the "form" of the design, and the patterns that are produced as liquid enters some or all of the segments of the channels in the direct field of view will be referred to as the "designs".

The present invention includes any kaleidoscope mirror arrangement, tube, and eye-piece combination in association with the novel object cell disclosed herein. The object cell consists of one or more channels containing liquid. The liquid in a given channel is constrained to remain in that channel, and may thus be confined to a limited portion of the direct field of view. The direction, or directions, of movement of the liquid is defined by the shape and orientation of the channel. A given object cell may contain more than one such independent channel.

In one modification of the invention, the channel allows circulatory flow through a closed-loop system, permitting the liquid to circulate in the channel. This is particularly effective when the channel is only partially filled with liquid. In this case, one observes that the colored designs smoothly appear and disappear as the kaleidoscope is rotated, thereby causing the plug of colored liquid to enter and leave the direct field of view. By appropriate design of the channels and positioning of the object cell relative to the mirrors, the liquid may successively enter and leave the direct field of view numerous times during a single revolution of the kaleidoscope, thereby giving rise to a unique, dynamic motion for the objects in a kaleidoscope and producing a novel type of kaleidoscopic image.

When the object cell contains a number of independent channels, each with a differently colored liquid, interesting and pleasant designs, both dynamic and static, ensue. The dynamic pattern is generated by rotating the kaleidoscope. Rotation of the object cell about the longitudinal axis while maintaining the tube stationary changes the form of the design. Rotation of the object cell about axes orthogonal to the longitudinal axis and translation of the object cell in a plane orthogonal to the longitudinal axis also cause the form of the design to be changed.

The channels of the object cell of the present invention may consist of transparent or translucent tubes. Alternatively, the channels may be cavities within a solid block of transparent or translucent material.

OBJECTS OF THE INVENTION

In accordance with the above-presented summary of the invention, and a further description which will follow, it is the primary object of this invention to provide a kaleidoscope the object cell of which is comprised of one or more channels through which liquid can flow as the kaleidoscope is rotated.

Another object of the present invention is to provide a kaleidoscope the object cell of which contains a mixture of a liquid and solid particles within channels through which said solid particles are constrained to drift as they rise or fall when the kaleidoscope is rotated.

Another object of the present invention is to provide a kaleidoscope the object cell of which contains one or more closed-loop channels through which liquid can circulate as the kaleidoscope is rotated.

Another object of the present invention is to provide a liquid-containing kaleidoscope wherein the liquid may successively enter and leave the direct field of view numerous times during a single revolution of the kaleidoscope.

Still another object of the invention is to provide a kaleidoscope that provides a new and pleasant type of image that has both dynamic and static aesthetically pleasing features.

Another object of this invention is to provide a kaleidoscope in which the designs produced can be predetermined.

Yet another object of the instant invention is to provide a kaleidoscope where the sequence of designs generated can be exactly reversed by reversing the direction of rotation of the kaleidoscope.

Another object of the present invention is to provide a kaleidoscope where different liquids can sequentially enter the direct field of view of the kaleidoscope.

Yet another object of this invention is to provide a kaleidoscope where different liquids can simultaneously move in different directions.

A further object of the present invention is to provide a kaleidoscope where different designs are produced by changing the angle at which the kaleidoscope is held relative to the horizontal.

Another object of the present invention is to provide a kaleidoscope where different liquids in the object cell can flow in conduits that are twisted about each other.

Still another object of the present invention is to provide a kaleidoscope the object cell of which enables liquids to flow in nonlinear paths.

These and other objects and advantages of the present invention will become apparent to those skilled in the art upon reading the details of construction and use as more fully set forth below, reference being made to the accompanying drawings forming a part hereof wherein like numerals refer to like parts throughout.

DESCRIPTION OF THE PRESENTLY PREFERRED EMBODIMENTS

Before several presently preferred embodiments of the present kaleidoscope, and in particular the object cell thereof, are described in detail, it is to be understood that this invention is not limited to the particular arrangements of parts shown, as such devices may, of course, vary. It is also to be understood that the terminology used herein is for the purpose of describing particular embodiments only, and it is not intended to be limiting.

Figures 1, 2, 3:
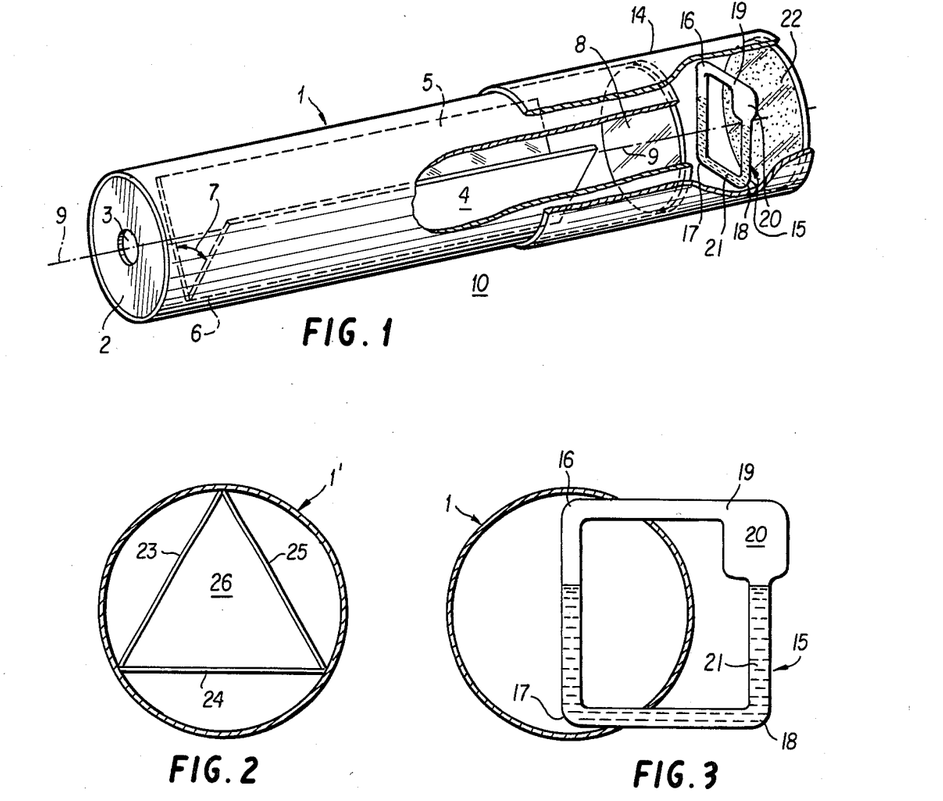
FIG. 1 is a side-view of a two-mirror kaleidoscope that is partly cut away to reveal the mirrors, showing a first embodiment of the object cell of the present invention and illustrating the longitudinal axis and a longitudinal plane.
FIG. 2 is a cross-sectional view of a three-mirror kaleidoscope.
FIG. 3 shows the first embodiment of the object cell of the present invention.
Figure 1:
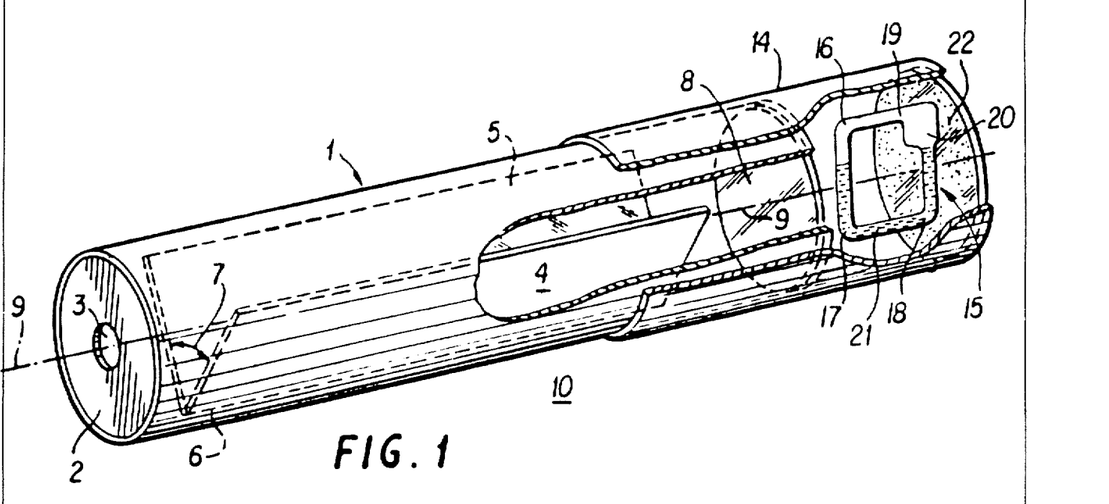

Referring now to the drawings and to FIG. 1 in particular, that figure shows a two-mirror kaleidoscope employing a first embodiment of the object cell of the present invention. The tube of the kaleidoscope is designated by the numeral 1. At the proximal end of the tube 1 is an opaque barrier 2 containing an eye-piece 3. Mirrors 4 and 5 lie inside the tube 1 and are coincident along a line 6 and are inclined at an angle 7 to each other. The mirrors 4 and 5 are fixedly attached to the tube 1. At the distal end of the tube 1 is a transparent window 8. A line 9 is the longitudinal axis of the tube, and the numeral 10 indicates a longitudinal plane.

At the distal end of the tube 1 is a rotatable container 14 housing a closed-loop receptacle 15. Numerals 16, 17, 18, and 19 designate the four corners of the closed-loop receptacle 15. In the embodiment illustrated in FIG. 1, the closed loop receptacle 15 is positioned so that it lies in the longitudinal plane 10. The numeral 20 designates a reservoir bulb that is at the corner 19 of the closed-loop receptacle 15. A liquid 21 is present in the closed-loop 15. Numeral 22 designates a translucent/frosted window at the opposite end of the rotatable container 14 from the transparent window 8 (i.e., at the distal end of the kaleidoscope).

FIG. 2 shows a cross-sectional view of a three-mirror kaleidoscope. Such a kaleidoscope includes mirrors 23, 24, and 25. The cross-sectional area corresponding to the direct field of view is designated by the numeral 26.

A person using the kaleidoscope looks into the eyepiece 3 and observes the portion(s) of the the object(s) that are in the direct field of view 26. In addition, the person observes the multiple images in the mirror of that same portion(s) of the object(s). The combination of the directly-viewed items in association with the reflected images produces a symmetrical pattern. In the case of a kaleidoscope having an object cell of the present invention, as shown in FIG. 1, the person observes primarily the segment between the corners 16, 17 of the closed-loop receptacle 15 that is closest to the eye-piece 3. If the liquid 21 is colored and the material forming the closed-loop receptacle 15 is colorless, the image from the empty portions of the closed-loop receptacle 15 is relatively insignificant and inconspicuous compared to the image that is produced when colored liquid enters the field of view.

When the kaleidoscope is held essentially in the horizontal position illustrated in FIG. 1 such that the reservoir bulb 20 is at the topmost position, a portion of the liquid 21 occupies the segment between the corners 16, 17 of the closed-loop receptacle 15 that is being observed. However, if the kaleidoscope is rotated 180° about the longitudinal axis 9 so that the reservoir bulb 20 is at the lowermost position, most of the liquid 21 will flow into the reservoir bulb 20, and the liquid 21 will leave the segment between the corners 16, 17 to a large extent. By rotating the kaleidoscope continuously, it is possible to cause the liquid 21 to oscillate as a plug, back and forth, in the closed-loop receptacle 15 so that one observes the symmetrical design as the colored liquid appears and disappears.

If one looks into the kaleidoscope while it is held horizontally (i.e., when the longitudinal axis 9 is horizontal) and the reservoir bulb 20 is at the topmost position as shown in FIG. 1 and then gradually points the translucent window 22 of the kaleidoscope toward the ground, the liquid 21 will flow out of the segment between the corners 16, 17 and into the reservoir bulb 20. Thus, by changing the angle at which the kaleidoscope is held with respect to the horizontal, the pattern that is observed through the eye-piece 3 changes. By repetitively pointing the kaleidoscope down from the horizontal and back up in this manner, a cycle is generated in which the image changes in a given sequence and then exactly reverses itself, in succession.

FIG. 3 shows a cross-sectional view of a second embodiment of the object cell shown in FIG. 1. Imagine that the closed-loop receptacle 15 in FIG. 1 is rotated 90° about an imaginary axis through the corners 16 and 17. This results in the arrangement illustrated in FIG. 3. In this case, if the kaleidoscope is rotated about its longitudinal axis 9, the liquid 21 circulates around the closed-loop receptacle 15 (relative to the loop itself), causing the segment between the corners 16, 17 to be successively full and empty. The changing pattern that is observed as the colored liquid enters and leaves has a very pleasant appearance. The sequence of designs can be reversed by reversing the direction of rotation of the kaleidoscope.

Now imagine that the closed-loop receptacle 15 is rotatable about the imaginary axis through the corners 16 and 17 so that it is oriented about halfway between the positions shown in FIGS. 1 and 3. In this case, rotation of the kaleidoscope about the longitudinal axis 9 causes circulation of the liquid 21 in the closed-loop receptacle 15, thereby generating a changing pattern. If, in addition, the observer alternately points the kaleidoscope down and up, the combined motion causes oscillation of the liquid 21 into and out of the segment between the corners 16, 17 that is being observed through the eye-piece 3.

The essential features of the present invention are embodied in the above descriptions, and the remainder of this specification will be devoted to showing how these concepts can be utilized to produce a significant improvement in the versatility of kaleidoscopes. The following discussion also emphasizes features of the present kaleidoscope that are unique to this invention.

The portion of the closed-loop that is observed through the eye-piece 3 does not have to be linear, but can be any of a wide variety of shapes, regular or irregular, thus adding to the multiplicity of kaleidoscopic patterns that are possible with this kaleidoscope. In addition, the object cell may be composed of more than one independent closed-loop system.

Figure 4:
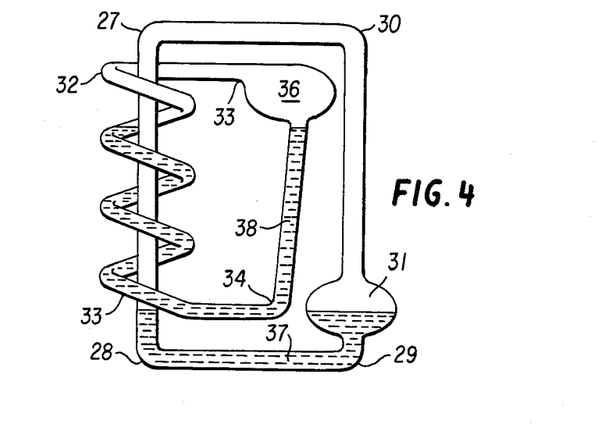
FIG. 4 shows a second embodiment of the object cell of the present invention.

FIG. 4 shows an object cell composed of two intertwined closed loops. The first closed loop 27, 28, 29, 30 is similar to that shown in FIG. 1 and FIG. 3 and includes a reservoir bulb 31 and a colored liquid 37. The second closed loop 32, 33, 34, 35 in this case contains a spiralling segment 32, 33 surrounding the linear segment 27, 28 of the first closed loop, a reservoir bulb 36, and a colored liquid 38. Very beautiful designs can be generated in the kaleidoscope by having differently colored liquids in the two closed loops.

More complicated designs can be produced by adding additional closed loops to those shown in FIG. 4, either adjacent to them or interwoven with them. If the two closed loops in FIG. 4 are appropriately oriented, the liquids in the two loops will circulate through those loops as the kaleidoscope is rotated. The timing of when each liquid enters and leaves the direct field of view can be determined by the positioning of the reservoir bulbs 31 and 36 and by the volume of the reservoir bulbs 31 and 36 relative to the volume of the remainder of the closed loops. The timing is also affected by the angle at which the first closed loop 27, 28, 29, 30 is arranged relative to a transverse plane of the kaleidoscope, as discussed above in relation to FIG. 3 for the closed-loop receptacle 15. Additionally, the corresponding orientation of the second closed loop 32, 33, 34, 35 relative to a transverse plane affects timing of the view. By control of these parameters in construction of the kaleidoscope, it is possible to have both colored liquids 37 and 38 enter the segments 27, 28 and 32, 33, respectively, simultaneously, successively, or in any sequence desired.

Actual identifiable reservoir bulbs such as 20 in FIGS. 1 and 3, and 31 and 36 in FIG. 4 are not absolutely necessary, since the tubing in these regions alone may serve as the liquid reservoir. However, the reservoir bulbs are included here to facilitate explaining operation of the kaleidoscope.

Figure 5:
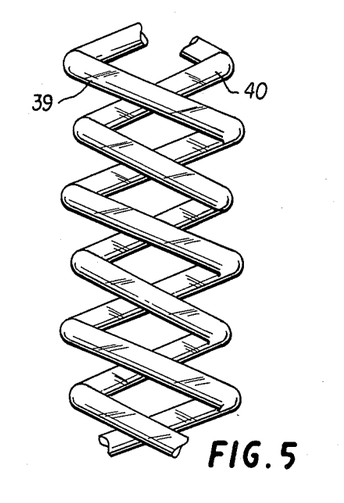
FIG. 5 shows a third embodiment of the object cell of the present invention.

FIG. 5 shows part of a third embodiment of a two-channel object cell for the present invention containing two tubes 39 and 40 that are twisted about each other, thus allowing the two liquids to pass through interweaving channels as the kaleidoscope is rotated, and thus giving rise to interesting patterns.

Figure 6:
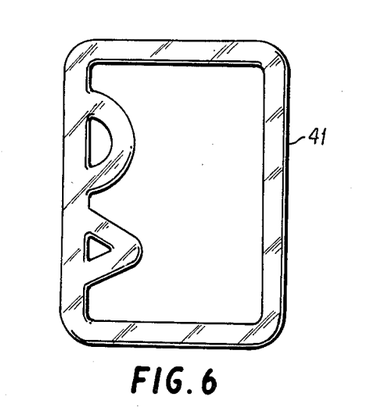
FIG. 6 shows a fourth embodiment of the object cell of the present invention.

A fourth embodiment of the object cell is illustrated in FIG. 6, which shows how a given closed-loop device 41 may have a channel that splits into two or more channels at one or more points, thus increasing the versatility of the types of designs that can be generated.

Referring to FIG. 1, the closed-loop receptacle 15 can be rotated about the longitudinal axis 9 by rotating the kaleidoscope as a whole. In this case, the channel segment between the corners 16, 17 that is being viewed remains fixed relative to the mirrors 4 and 5, and thus the form of the design that is produced as the kaleidoscope is rotated is fixed. Alternatively, the closed-loop receptacle 15 may be rotated about the longitudinal axis 9 by rotating the rotatable container 14 while the tube 1 and the mirrors 4 and 5 are maintained stationary. In this case, the orientation of the channel segment between the corners 16, 17 changes relative to the position of the mirrors 4 and 5, and thus the form of the design changes throughout the course of this type of rotation.

Since there is no free fall of liquid in this kaleidoscope because the liquid is confined to tubular channels and exists as a plug if the cross-sectional area of the channels is not too large, the position of the liquid can be anchored at any desired location simply be stopping the rotation of the kaleidoscope. In this way, a design that is found to be particularly pleasing can be retained for looking at indefinitely or for transferring to another person.

Because the designs in the present kaleidoscope are not totally random, but are dictated by the design of the various channels, it is possible to reproduce a particular design exactly after it has been destroyed. This has not been possible with liquid-containing kaleidoscopes known heretofore.

Further, since the liquid is constrained to flow in channels, it can be caused to exactly reverse its movements, and thus one can repeatedly cause the liquid to undergo a given movement and to exactly repeat a dynamic design that one finds appealing.

One could also add a pump for inducing the flow of liquid through the channels, such as by means of a squeezable bulb or by means of some other type of pump.

The liquid in the present kaleidoscope can be water, preferably colored with a nontoxic dye such as food coloring. Other liquids such as glycerine or various oils, etc. may also be used. The inventor has found the use of water colored with food coloring to be particularly effective. The addition of a small amount of detergent sometimes helps to improve the flow of liquid in the channels, particularly when the channels are very narrow. The addition to the liquid of small, sparkling, solid particles known as glitter can add an additional pleasing appearance to the designs.

Figures 7, 8, 9:
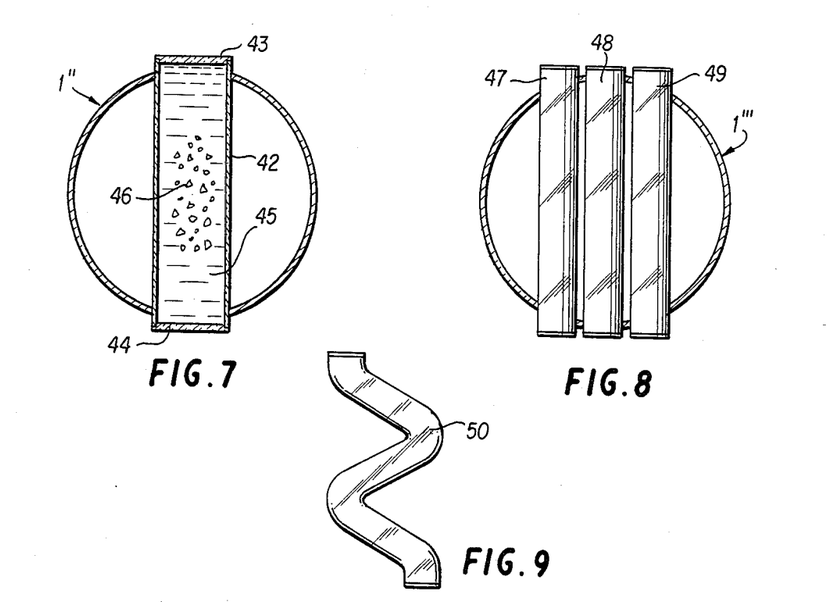
FIG. 7 shows a fifth embodiment of the object cell of the present invention.
FIG. 8 shows a sixth embodiment of the object cell of the present invention.
FIG. 9 shows a seventh embodiment of the object cell of the present invention.

The object cells described thus far in this specification all consist of closed-loop types in which the liquid circulates around the loop. However, the concept of imposing limited or directed flow on a liquid can also be implemented in object cells that do not contain a looped circuit. FIG. 7 shows an elongated cylindrical container 42 that is closed at both ends 43 and 44. The elongated cylindrical container 42 holds a liquid 45 in which are suspended solid particles 46. The solid particles 46 may have specific gravities that are greater or lesser than that of the liquid, or a combination of both types of particles may be present. The elongated cylindrical container 42, plus contents, can be used as an object cell, as indicated in FIG. 7. As the kaleidoscope is rotated, the solid particles 46 rise or fall depending on their specific gravity relative to the liquid 45. These migrating particles are constrained to follow the path defined by the elongated cylindrical container 42.

In other liquid-containing kaleidoscopes, the liquid or solid objects contained therein fall vertically downwardly, or the suspended solids rise vertically if they have a specific gravity less than that of the liquid. In the kaleidoscope of the present invention, the liquids or solids are not confined to vertical up and down flow, but may move in many different directions as determined by the orientation of the channels. Different liquids and solids can flow in different directions simultaneously.

The form of the designs in a kaleidoscope having an object cell like that in FIG. 7 can be changed by rotating the object cell relative to the tube or by moving the object cell in a transverse plane of the kaleidoscope. For example, using a two-mirror kaleidoscope with mirrors inclined at 36°, it is possible to generate designs where the image shows the solid objects moving along a pentagonal path or along "rays" of narrow or wide star designs. The complexity of such designs can be enhanced by using a number of such tubular containers side-by-side, as illustrated in FIG. 8, in which 47, 48, and 49 represent independent tubular containers or independent segments within a single container. The tubular containers may also be nonlinear, or as illustrated by the object cell 50 in FIG. 9.

The channels in the object cell of the present invention can be constructed from transparent or translucent tubing such as glass or any of a variety of plastics or other material. The tubing used for this purpose can be rigid or flexible in texture. The tubing can be made from a combination of these materials or it can all be made from a single type of material. Alternatively, the channels may consist of cavities inside a solid block of transparent material. The channel may be of unit construction or may be composed of separate parts.

Other extensions and modifications of this invention will be obvious to one familiar with the art upon reading this specification. For example, the variety of designs can be increased by constructing the kaleidoscope so that the object cell is translatable in a transverse plane and orientable in all possible directions. Embodiments in which the liquid flows toward and away from the viewer give an enhanced three-dimensional aspect that is pleasing. It is also obvious that the object cell need not be confined within the dimensions of the diameter of the tube of the kaleidoscope, but it may extend beyond those boundaries. One can also consider the use of flexible tubing for the object cell, which would allow the designs to be altered by bending the tubing in various ways.

Other kaleidoscope-type devices also exist to which the present object cell is applicable. For example, a toy that is commercially available is analogous to a kaleidoscope, but instead of having interiorly mounted plane-surfaced mirrors, the inner surface of the tube itself is reflecting. Moving objects in the object cell give rise to swirls of color that are visible through the eye-piece.

One modification of an optical toy using such a cylindrical mirror is described by Papke in U.S. Pat. No. 2,484,116, and this type of device is also discussed in the Scientific American article cited above. The object cell of the present invention can be used in association with that type of device.

The liquid in the object cell of the present invention may have characteristics which add extra appeal to the kaleidoscope as an amusement device. For example the liquid may be fluorescent or phosphorescent, which would allow it to glow in the dark with or without the influence of ultraviolet radiation. Similarly, the channels may contain chemiluminescent materials that can produce very beautiful images in the dark. A channel may also contain two or more immiscible liquids.

Other obvious extensions to this invention could relate to the use of three or more mirrors disposed in a frusto-pyramidal configuration in which the narrower end is pointing forward (i.e., away from the user) or rearward (i.e. toward the user). In addition, it is a simple matter to devise a covering for the liquid channels in the form of a bulb or a cylinder so as to obscure their view from the outside.

The previous discussions in this specification relate primarily to channels in which the liquid moves as a plug—that is, the liquid occupies the full cross-sectional area of the channel segment. If channels of greater diameter are used, the liquid may not occupy the full cross-sectional area of the channel. In that case, some differences in behavior will be observed. However, it is still within the domain of this invention.

The instant invention is shown and described in what is considered the most practical and preferred embodiments. It is recognized, however, that departures may be made therefrom which are within the scope of the invention and that obvious modifications will occur to one skilled in the art upon reading this disclosure.

What is claimed as new and desired to be secured by Letters Patent of the United States is:

1. In a kaleidoscope comprising plural reflecting surfaces joined along one edge, a viewing means proximal to one end of said surfaces and an object cell proximal to the other end of said surfaces, the improvement comprising an object cell comprising at least one channel containing liquid.

2. In a kaleidoscope comprising plural reflecting surfaces joined along one edge, a viewing means proximal to one end of said surfaces and an object cell proximal to the other end of said surfaces, the improvement comprising an object cell comprising at least one closed-loop channel, said at least one closed-loop channel containing liquid that is capable of being circulated around said at least one closed-loop channel.

3. A kaleidoscope as in claims 1 or 2 wherein:
   (a) said at least one channel is nonlinear and
   (b) said liquid is constrained to flow in a nonlinear path as said liquid flows through said at least one channel.

4. In a kaleidoscope comprising plural reflecting surfaces joined along one edge, a viewing means proximal to one end of said surfaces and an object cell proximal to the other end of said surfaces, the improvement comprising an object cell comprising a plurality of independent channels, each one of said plurality of independent channels containing liquid and the direction of motion of the liquid in each one of said plurality of independent channels being independent of those in the other ones of said plurality of independent channels.

5. A kaleidoscope as in claim 4 wherein at least two of said plurality of independent channels are twisted about each other.

6. A kaleidoscope as in claims 1 or 2 wherein the design changes as a function of the angle at which the kaleidoscope is held with respect to the horizontal.

7. A kaleidoscope as in claims 1 or 2 wherein different segments of said least one channel are of different cross-sectional areas.

8. A kaleidoscope as in claims 1 or 2 wherein said at least one channel is of such a shape that it allows the flowing liquid to enter and leave the field of view several times during a single revolution of the kaleidoscope.

9. A kaleidoscope as in claims 1 or 2 wherein:
    (a) the kaleidoscope further comprises an eye-piece and
    (b) said at least one channel enables said liquid to flow toward and away from said eye-piece as the kaleidoscope is rotated.

10. A kaleidoscope as in claims 1 or 2 wherein said at least one channel is flexible.

11. A kaleidoscope as in claims 1 or 2 wherein said liquid contains a solid.

12. A kaleidoscope as in claim 4 wherein each one of said plurality of channels contains a liquid having properties different from liquids in the others of said plurality of channels.

13. A kaleidoscope as in claims 1 or 2 and further comprising a pump for impelling said liquid within said at least one channel.

* * * * *

UNITED STATES PATENT AND TRADEMARK OFFICE
CERTIFICATE OF CORRECTION

PATENT NO. : 4,740,046

DATED : April 26, 1988

INVENTOR(S) : Patrick MacCarthy

It is certified that error appears in the above-identified patent and that said Letters Patent is hereby corrected as shown below:

The title page should be deleted to appear as per attached title page.

Figure 1 should be deleted to appear as per attached sheet.

Signed and Sealed this

Eighteenth Day of April, 1989

Attest:

DONALD J. QUIGG

*Attesting Officer*

*Commissioner of Patents and Trademarks*

United States Patent [19]

MacCarthy

[11] Patent Number: 4,740,046
[45] Date of Patent: Apr. 26, 1988

[54] LIQUID KALEIDOSCOPE

[76] Inventor: Patrick MacCarthy, 5263 Arbutus St., Arvada, Colo. 80002

[21] Appl. No.: 866,705

[22] Filed: May 27, 1986

[51] Int. Cl.⁴ ............................................. G02B 23/00
[52] U.S. Cl. ........................................................ 350/4.2
[58] Field of Search .................... 40/406, 439, 441; 353/1, 2; 350/4.1, 4.2

[56] References Cited

U.S. PATENT DOCUMENTS

| | | | |
|---|---|---|---|
| 1,078,008 | 11/1913 | Stough | 350/4.2 |
| 2,484,116 | 10/1949 | Papke | 350/4.1 |
| 3,039,356 | 6/1962 | Knittel | 350/4.2 |
| 3,383,150 | 5/1968 | Powers | 350/4.2 |
| 3,738,036 | 6/1973 | Landsinger et al. | 350/4.2 X |
| 3,748,013 | 7/1973 | Orans | 350/4.2 |
| 3,756,685 | 9/1973 | Forsee | 350/4.2 |
| 3,973,340 | 8/1976 | Khawand | 40/406 |

OTHER PUBLICATIONS

Mirrors, Prisms and Lenses, James P. C. Southhall, 3rd Edition, pp. 42–51, 1918.

Curiosities of Light Rays and Light Waves, S. Tolansky, pp. 16–25, 1964.

The Amateur Scientist, Scientific American, Dec. 1985, vol. 253, No. 6, pp. 134–145.

Through the Kaleidoscope, Cozy Baker, Beechcliff Books, Annapolis, Maryland, 1985.

*Primary Examiner*—Richard A. Wintercorn
*Attorney, Agent, or Firm*—Oblon, Fisher, Spivak, McCleiland & Maier

[57] ABSTRACT

One or more tubular channels contain liquid, a fluent solid, or a mixture of liquid and solid particles. The channels limit the spatial extent of the contents and constrain the contents to flow in limited directions. The channels may consist of a closed loop through which the contents can flow as the kaleidoscope is rotated. The direction of flow can be reversed by reversing the direction of rotation of the kaleidoscope. The contents in different channels are preferably colored differently. The channels may exist side-by-side or may be intertwined. Multiple reflections in the mirrors of the kaleidoscope of the stationary or moving contents generate pleasant static or dynamic symmetrical designs. These designs can be reproduced at will. The nature of the design that is observed by rotating the kaleidoscope can be altered by changing the position of the object cell relative to the mirrors.

13 Claims, 2 Drawing Sheets

UNITED STATES PATENT AND TRADEMARK OFFICE
CERTIFICATE OF CORRECTION

PATENT NO. : 4,740,046

DATED : MAY 27, 1986

INVENTOR(S) : PATRICK MacCARTHY

It is certified that error appears in the above-identified patent and that said Letters Patent is hereby corrected as shown below:

FIG. 1